United States Patent
Ohori et al.

(10) Patent No.: US 9,944,812 B2
(45) Date of Patent: Apr. 17, 2018

(54) COMPOSITION FOR INK AND TRANSPARENT ELECTRODE

(71) Applicant: Nagase ChemteX Corporation, Osaka-shi, Osaka (JP)

(72) Inventors: Tatsuya Ohori, Hyogo (JP); Yasunori Kurushima, Hyogo (JP); Takahiro Sakurai, Hyogo (JP)

(73) Assignee: Nagase ChemteX Corporation, Osaka (JP)

( * ) Notice: Subject to any disclaimer, the term of this patent is extended or adjusted under 35 U.S.C. 154(b) by 22 days.

(21) Appl. No.: 14/616,260

(22) Filed: Feb. 6, 2015

(65) Prior Publication Data

US 2015/0225589 A1  Aug. 13, 2015

(30) Foreign Application Priority Data

Feb. 12, 2014  (JP) ................................. 2014-024541

(51) Int. Cl.
| | |
|---|---|
| *H01G 9/00* | (2006.01) |
| *C09D 11/52* | (2014.01) |
| *H01B 1/12* | (2006.01) |
| *C09D 11/10* | (2014.01) |

(52) U.S. Cl.
CPC .............. *C09D 11/52* (2013.01); *C09D 11/10* (2013.01); *H01B 1/124* (2013.01)

(58) Field of Classification Search
CPC .................................. C09D 5/24; C08L 65/00
USPC ...... 252/500, 511, 182.1; 200/56 R; 361/523
See application file for complete search history.

(56) References Cited

U.S. PATENT DOCUMENTS

| | | | |
|---|---|---|---|
| 6,358,437 B1 | 3/2002 | Jonas et al. | |
| 2007/0171597 A1* | 7/2007 | Merker | ................ H01G 9/0036 361/523 |
| 2009/0120775 A1* | 5/2009 | Morita | .................... C08L 65/00 200/56 R |
| 2009/0256117 A1* | 10/2009 | Seshadri | .............. C08G 61/126 252/500 |
| 2010/0085319 A1* | 4/2010 | Hayashi | .................. G06F 3/045 345/173 |
| 2010/0252782 A1* | 10/2010 | Masahiro | ................. C09D 5/24 252/511 |
| 2010/0255323 A1* | 10/2010 | Nakamura | ............... H01B 1/22 428/457 |
| 2011/0175036 A1* | 7/2011 | Masahiro | ................. C08J 7/047 252/500 |
| 2012/0298497 A1 | 11/2012 | Maeda | |
| 2013/0092878 A1* | 4/2013 | Xiao | ........................ C09D 5/24 252/500 |
| 2013/0157105 A1 | 6/2013 | Picard | |
| 2013/0251983 A1* | 9/2013 | Kondo | ..................... H01B 1/22 428/336 |
| 2016/0196892 A1 | 7/2016 | Ohori | |

FOREIGN PATENT DOCUMENTS

| | | | |
|---|---|---|---|
| CN | 1509587 | 6/2004 | |
| CN | 101309965 | 11/2008 | |
| CN | 102952423 | 3/2013 | |
| JP | 2002-500408 | 1/2002 | |
| JP | 2004-432307 | 10/2004 | |
| JP | 2004-532307 | 10/2004 | |
| WO | 02/079316 | 10/2002 | |
| WO | 02/080627 | 10/2002 | |
| WO | WO 02/079316 | * 10/2002 | ............... H01B 1/00 |

* cited by examiner

*Primary Examiner* — Khanh Tuan Nguyen
(74) *Attorney, Agent, or Firm* — Hamre, Schumann, Mueller & Larson, P.C.

(57) ABSTRACT

Provided is an ink composition having excellent printing properties and capable of forming a thick transparent conductive film with low surface resistivity even when it is used in gravure offset printing or pad printing. The ink composition contains (A) a conductive polymer, (B) a binder, and (C) a conductivity enhancer, wherein the composition has a viscosity at 25° C. of 5 to 500 dPa·s and a solids content of 10% to 80% by weight, and the composition exhibits a surface resistivity of 2000 Ω/sq or lower and a total light transmittance of 70% or higher when applied at a wet film thickness of 15 μm.

13 Claims, No Drawings

COMPOSITION FOR INK AND TRANSPARENT ELECTRODE

TECHNICAL FIELD

The present invention relates to an ink composition and a transparent electrode.

BACKGROUND ART

In recent years the demand for transparent conductive laminates for use as transparent electrodes, which are essential components of touch panels or capacitive switches for various electronic devices, has been increasing. Transparent conductive laminates include a transparent substrate and a transparent conductive film formed from an ink composition containing a conductive polymer, which is stacked on the substrate. These transparent conductive films can be prepared by known methods such as offset printing and screen printing. These printing methods, which do not require any complicated process, allow for easy patterning at low costs, and therefore have quite excellent productivity.

Offset printing, among these, is attracting interest as a method allowing printing on three-dimensional objects. In particular, gravure offset printing allows drawing of fine line patterns and is therefore suitable for forming transparent electrode interconnects of capacitive touch panels or touch sensors, which require fine line patterns, but on the other hand it cannot disadvantageously produce thick coatings but can only provide limited coating thicknesses due to its process requirements. Therefore, if a usual ink composition with a low solids content is used in this printing process, the transparent conductive film thus prepared disadvantageously has a low dry film thickness and a high surface resistivity. In addition, usual ink compositions, which are aqueous compositions, have the drawback of poor wettability on blankets.

Meanwhile, pad printing has the advantage of allowing printing also on complex three-dimensional objects.

SUMMARY OF INVENTION

Technical Problem

It is an object of the present invention to provide an ink composition having excellent printing properties and capable of forming a thick transparent conductive film with low surface resistivity even when it is used in gravure offset printing or pad printing.

Solution to Problem

The present inventors have conducted many studies and have found that if an ink composition having a high solids content is used in gravure offset printing or pad printing, a transparent conductive film can be formed which has a dry film thickness high enough to reduce the increase in surface resistivity, and also has improved printing properties. Then the present inventors have found that the use of a conductive polymer prepared by a specific step and a binder having a high solids content can increase the solids content of the ink composition up to 80% by weight. Thus, the present invention has been completed. It is noted that usual ink compositions have a solids content of about 1% to 5% by weight.

Specifically, the ink composition of the present invention is characterized in that it contains:

(A) a conductive polymer;
(B) a binder; and
(C) a conductivity enhancer, wherein the composition has a viscosity at 25° C. of 5 to 500 dPa·s and a solids content of 10% to 80% by weight, and the composition exhibits a surface resistivity of 2000 Ω/sq or lower and a total light transmittance of 70% or higher when applied at a wet film thickness of 15 μm.

The ink composition of the present invention preferably has a solids content of 20% to 70% by weight.

The ink composition of the present invention preferably has a surface tension of 50 mN/m or less.

In the ink composition of the present invention, the conductive polymer (A) is preferably a composite of poly(3,4-ethylenedioxythiophene) and polystyrene sulfonic acid.

In the ink composition of the present invention, the binder (B) preferably contains a reactive functional group and is soluble or dispersible in water or alcohol.

The ink composition of the present invention preferably further contains at least one thickener selected from the group consisting of polyacrylic acid resins, cellulose ether resins, polyvinylpyrrolidones, polyurethanes, carboxyvinyl polymers, and polyvinyl alcohols.

The ink composition of the present invention preferably further contains at least one surfactant and/or leveling agent selected from the group consisting of siloxane compounds, fluorine compounds, and acrylic compounds.

The ink composition of the present invention preferably further contains a compound containing a water-soluble antioxidant that is a lactone ring substituted with two hydroxyl groups or a compound having two or more phenolic hydroxyl groups.

In the ink composition of the present invention, the conductive polymer (A) is preferably a dispersion prepared by a step of polymerization at a monomer concentration of 0.5% to 2.5% by weight or a concentration step.

The ink composition of the present invention is preferably for use in offset printing, and more preferably for use in gravure offset printing or pad printing.

The transparent electrode of the present invention is characterized by being formed from the ink composition of the present invention.

The transparent electrode of the present invention is preferably a capacitive touch sensor.

Advantageous Effects of Invention

The ink composition of the present invention, which has a high solids content, can form a transparent conductive film having a dry film thickness high enough to reduce the increase in surface resistivity, even when it is printed by a method that can only provide limited coating thicknesses, such as gravure offset printing or pad printing. Moreover, the ink composition can easily form a film after transfer and can easily be thickened, and the composition therefore has excellent printing properties.

The transparent electrode of the present invention, which is formed from the ink composition of the present invention, has excellent electric conductivity and transparency.

DESCRIPTION OF EMBODIMENTS

<<Ink Composition>>

First, the ink composition of the present invention is described.

The ink composition of the present invention is characterized in that it contains (A) a conductive polymer, (B) a binder, and (C) a conductivity enhancer, the composition has a viscosity at 25° C. of 5 to 500 dPa·s and a solids content of 10% to 80% by weight, and the composition exhibits a surface resistivity of 2000 Ω/sq or lower and a total light transmittance of 70% or higher when applied at a wet film thickness of 15 μm.

<(A) Conductive Polymer>

The conductive polymer (A) is a compounding ingredient which imparts electric conductivity to transparent conductive films. Examples of the conductive polymer (A) include, but are not limited to, conventional conductive polymers, such as, specifically, polythiophene, polypyrrole, polyaniline, polyacetylene, polyphenylene vinylene, and polynaphthalene, and derivatives of these. These may be used alone, or two or more of these may be used in combination. In particular, conductive polymers having at least one thiophene ring in the molecule are preferred because the molecule containing therewithin a thiophene ring is likely to be highly conductive. The conductive polymer (A) may be in the form of a composite with a dopant such as a polyanion.

Among the conductive polymers having at least one thiophene ring in the molecule, poly(3,4-disubstituted thiophenes) are more preferred because of their quite excellent conductivity and quite excellent chemical stability. When the ink composition contains a poly(3,4-disubstituted thiophene) or a composite of a poly(3,4-disubstituted thiophene) and a polyanion (dopant), a transparent conductive film can be formed at low temperatures in a short time, resulting in excellent productivity. The polyanion refers to a dopant for the conductive polymer and will be described in detail later.

The poly(3,4-disubstituted thiophene) is particularly preferably a poly(3,4-dialkoxythiophene) or poly(3,4-alkylenedioxythiophene). The poly(3,4-dialkoxythiophene) or poly(3,4-alkylenedioxythiophene) is preferably a cationic polythiophene having a recurring structural unit represented by the formula (I):

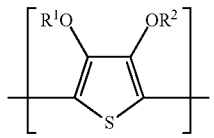

wherein $R^1$ and $R^2$ each independently represents hydrogen or a $C_{1-4}$ alkyl group, or $R^1$ and $R^2$ are joined to form a $C_{1-4}$ alkylene group. Examples of the $C_{1-4}$ alkyl group include, but are not limited to, methyl, ethyl, propyl, isopropyl, n-butyl, isobutyl, sec-butyl, and t-butyl. Examples of the $C_{1-4}$ alkylene group formed by joining $R^1$ and $R^2$ include, but are not limited to, methylene, 1,2-ethylene, 1,3-propylene, 1,4-butylene, 1-methyl-1,2-ethylene, 1-ethyl-1,2-ethylene, 1-methyl-1,3-propylene, and 2-methyl-1,3-propylene. Preferred among these are methylene, 1,2-ethylene, and 1,3-propylene, with 1,2-ethylene being more preferred. The hydrogens in the $C_{1-4}$ alkyl group or $C_{1-4}$ alkylene group may be partially substituted. The polythiophene containing a alkylene group is particularly preferably poly(3,4-ethylenedioxythiophene).

The conductive polymer (A) preferably has a weight average molecular weight of 500 to 100000, more preferably 1000 to 50000, and most preferably 1500 to 20000. The conductive polymer having a weight average molecular weight of less than 500 cannot ensure the viscosity required of the ink composition, and may provide reduced conductivity to the transparent conductive film prepared therefrom.

The dopant is preferably but not limited to a polyanion. The polyanion can form an ion pair with a polythiophene (derivative) to produce a composite, thereby enabling the polythiophene (derivative) to be stably dispersed in water. Examples of the polyanion include, but are not limited to, carboxylic acid polymers (e.g. polyacrylic acid, polymaleic acid, polymethacrylic acid), and sulfonic acid polymers (e.g. polystyrene sulfonic acid, polyvinyl sulfonic acid, polyisoprene sulfonic acid). Moreover, the carboxylic acid polymer or sulfonic acid polymer may be a copolymer of a vinyl carboxylic acid or vinyl sulfonic acid and a polymerizable monomer such as acrylates or aromatic vinyl compounds (e.g. styrene and vinylnaphthalene). Among these, polystyrene sulfonic acid is particularly preferred.

The polystyrene sulfonic acid preferably has a weight average molecular weight of 20000 to 500000, and more preferably 40000 to 200000. If the polystyrene sulfonic acid having a molecular weight outside the range mentioned above is used, the polythiophene-based conductive polymer may have reduced dispersion stability in water. The weight average molecular weight is determined by gel permeation chromatography (GPC).

The conductive polymer (A) is preferably a composite of poly(3,4-ethylenedioxythiophene) and polystyrene sulfonic acid because the resulting transparent conductive film has particularly excellent transparency and conductivity.

Although not limited thereto, the conductive polymer (A) preferably has a conductivity of 0.01 S/cm or higher and more preferably 0.05 S/cm or higher because such a polymer provides sufficient conductivity to the transparent conductive film.

The amount of the conductive polymer (A) in the ink composition is not particularly limited. The amount of the conductive polymer (A) in the transparent conductive laminate prepared therefrom is preferably 0.01 to 50.0 mg/m², and more preferably 0.1 to 10.0 mg/m². If the amount is less than 0.01 mg/m², the conductive polymer (A) content in the transparent conductive film may be too low to ensure sufficient conductivity for the transparent conductive film, while if the amount is more than 50.0 mg/m², the conductive polymer (A) content in the transparent conductive film may be so high that the strength of the coating film and film forming properties can be adversely affected.

Although not limited thereto, the conductive polymer (A) preferably has a viscosity of 5 to 500 dPa·s, and more preferably 10 to 500 dPa·s, as measured at 25° C. as a 1 to 5% aqueous dispersion, preferably as a 2 to 5% aqueous dispersion. If the viscosity is less than 5 dPa·s, the viscosity required of the ink composition cannot be ensured. If the viscosity is more than 500 dPa·s, problems are likely to occur in that, for example, foams may be formed during the mixing or the conductive polymer is not uniformly miscible. The viscosity as used herein is determined using a B-type viscometer.

Although not limited thereto, the conductive polymer (A) preferably has a thixotropic index (Ti) of 0.1 to 10, more preferably 1 to 10, and still more preferably 1 to 8, as measured at 25° C. as a 1 to 5% aqueous dispersion, preferably as a 2 to 5% aqueous dispersion. The ink composition prepared from the conductive polymer (A) having a thixotropic index within the range mentioned above can advantageously achieve the thixotropic index described later. The thixotropic index as used herein is defined as a ratio of a viscosity $\eta_1$ at a shear rate of 1 (1/s) to a viscosity $\eta_{10}$ at a shear rate of 10 (1/s) (Ti value=$\eta_1/\eta_{10}$), as determined at 25° C. using a rheometer.

Although not limited thereto, the conductive polymer (A) preferably has a yield stress of 1 to 100 Pa, and more preferably 2 to 100 Pa, as measured at 25° C. as a 1 to 5% aqueous dispersion, preferably as a 2 to 5% aqueous dispersion. The ink composition prepared from the conductive polymer (A) having a yield stress within the range mentioned above can advantageously achieve the yield stress described later. The yield stress is calculated by measuring stress at 25° C. using a rheometer while varying the shear rate over the range of 0.01 (1/s) to 100 (1/s), followed by fitting the Casson equation:

$$\sqrt{\text{stress}} = \sqrt{\text{viscosity}} \cdot \sqrt{\text{shear rate}} + \sqrt{\text{yield stress}}.$$

As an example of a method of preparing the conductive polymer (A), a method of preparing an aqueous dispersion of a composite of a polythiophene represented by the formula (I) and a dopant is explained. The aqueous dispersion of the composite can be prepared by the step of oxidatively polymerizing a 3,4-dialkoxythiophene represented by the formula (II) below in an aqueous solvent using an oxidant in the presence of a dopant.

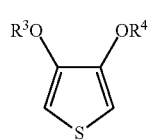
(II)

In the formula, $R^3$ and $R^4$ each independently represents hydrogen or a $C_{1-4}$ alkyl group, or $R^3$ and $R^4$ are joined to form a $C_{1-4}$ alkylene group. Examples of the $C_{1-4}$ alkyl group include, but are not limited to, methyl, ethyl, propyl, isopropyl, n-butyl, isobutyl, sec-butyl, and t-butyl. Examples of the $C_{1-4}$ alkylene group formed by joining $R^3$ and $R^4$ include, but are not limited to, methylene, 1,2-ethylene, 1,3-propylene, 1,4-butylene, 1-methyl-1,2-ethylene, 1-ethyl-1,2-ethylene, 1-methyl-1,3-propylene, and 2-methyl-1,3-propylene. Preferred among these are methylene, 1,2-ethylene, and 1,3-propylene, with 1,2-ethylene being more preferred. The hydrogens in the $C_{1-4}$ alkyl group or $C_{1-4}$ alkylene group may be partially substituted.

Polythiophenes can be prepared by oxidatively polymerizing monomers by chemical polymerization using various oxidants. The chemical polymerization is simple enough for mass production, and is therefore more suitable for industrial production than the conventional electrolytic polymerization.

Examples of the oxidant used in the chemical Polymerization include, but are not limited to, oxidants containing a sulfonic acid compound as anion and a high valence transition metal as cation. Examples of high valence transition metal ions forming such oxidants include $Cu^{2+}$, $Fe^{3+}$, $Al^{3+}$, $Ce^{4+}$, $W^{6+}$, $Mo^{6+}$, $Cr^{6+}$, $Mn^{7+}$, and $Sn^{4+}$. Preferred among these are $Fe^{3+}$ and $Cu^{2+}$. Specific examples of oxidants containing a transition metal cation include $FeCl_3$, $Fe(ClO_4)_3$, $K_2CrO_7$, alkali perborates, potassium permanganate, and copper tetrafluoroborate. Moreover, examples of oxidants other than the oxidants containing a transition metal cation include alkali persulfates, ammonium persulfate, and $H_2O_2$. Other examples include hypervalent compounds such as hypervalent iodine reagents.

The dopant such as polyanion is preferably used in an amount ranging from 50 to 2000 parts by weight, and more preferably from 100 to 1000 parts by weight, per 100 parts by weight of 3,4-dialkoxythiophene.

The solvent is an aqueous solvent, and particularly preferably water. A water-soluble solvent, such as alcohol (e.g. methanol, ethanol, 2-propanol, 1-propanol), acetone, or acetonitrile, may be added to water and used.

The conductive polymer (A) having the above viscosity can be prepared by controlling the conditions so as to increase the reaction temperature, decrease the pH of the reaction system, slow down the stirring rate, reduce the concentration of dissolved oxygen, and/or increase the reaction concentration, relative to commonly and widely used conditions for the preparation of conductive polymers. It is considered that the control of these conditions enables the resulting conductive polymer to have a higher molecular weight or agglomerate and therefore to achieve the above viscosity and even the above thixotropic index/yield stress.

The temperature of the oxidative polymerization reaction is preferably 0 to 40° C., and more preferably 5 to 35° C. If the temperature is lower than 0° C., the polymerization reaction of the conductive polymer may not sufficiently proceed, resulting in insufficient conductivity. If the temperature is higher than 40° C., the polymerization reaction tends to proceed too much, resulting in poor dispersion stability.

The pH during the polymerization is preferably 0.1 to 5.0, and more preferably 0.1 to 3.0. If the pH is lower than 0.1, the polymerization reaction may proceed too much, resulting in poor dispersion stability. If the pH is higher than 5.0, the polymerization reaction of the conductive polymer tends not to sufficiently proceed, resulting in insufficient conductivity.

The stirring rate of the reaction mixture during the polymerization is preferably 100 to 1000 rpm, and more preferably 200 to 500 rpm. If the stirring rate is less than 100 rpm, the polymerization reaction may proceed too much, resulting in poor dispersion stability. If the stirring rate is more than 1000 rpm, the polymerization reaction of the conductive polymer tends not to sufficiently proceed, resulting in insufficient conductivity.

The reaction concentration of the reaction mixture during the polymerization is preferably 1 to 10%, and more preferably 1 to 6%. If the reaction concentration is less than 1%, the polymerization reaction of the conductive polymer may not sufficiently proceed, resulting in insufficient conductivity. If the reaction concentration is more than 10%, the polymerization reaction tends to proceed too much, resulting in poor dispersion stability.

The conductive polymer (A) prepared as mentioned above has an average particle size of 60 to 10000 nm, preferably 70 to 5000 nm, due to an increase in molecular weight or secondary agglomeration. The average particle size as used herein is determined by dynamic light scattering (DLS).

In the present invention, the aqueous dispersion of the conductive polymer (A) prepared by the aforementioned process can be used as a raw material to be compounded, without concentration.

The conductive polymer (A) is preferably a dispersion prepared by a step of polymerization at a monomer concentration of 0.5% to 2.5% by weight or a concentration step because such a dispersion allows the ink composition to have a high solids content.

For example, in the case of preparing an aqueous dispersion of a composite of a polythiophene represented by the formula (I) and a dopant, in the step of polymerization at a monomer concentration of 0.5% to 2.5% by weight, polymerization is carried out while maintaining the concentration of 3,4-dialkoxythiophene represented by the formula (II) at a concentration (0.5% to 2.5% by weight) higher than commonly and widely used conditions of reaction concentration for the preparation of conductive polymers.

In the concentration step, for example, an aqueous dispersion of a conductive polymer prepared under common production conditions is heated at 20 to 50° C. under reduced pressure to evaporate water and concentrate the dispersion. In the concentration step, a commercially available dispersion, for example, Clevios™ produced by Heraeus K.K., may be used.

Moreover, in another embodiment of the concentration step, freeze-drying as disclosed in JP 4095894 B may be performed. A solid obtained by such freeze-drying can also be used in the ink composition of the present invention.

<(B) Binder>

A binder (B) is added in order to bind the compounding ingredients of the ink composition of the present invention to one another to more reliably form a transparent conductive film (including conductive patterns). The binder (B) is preferably but not limited to at least one selected from the group consisting of, for example, polyester resins, polyacrylic acid resins, polyurethanes, epoxy resins, acrylic resins, alkoxysilane oligomers, and polyolefin resins.

The polyester resin is not particularly limited as long as it is a high-molecular compound prepared by polycondensation of a compound having two or more carboxyl groups in the molecule and a compound having two or more hydroxyl groups. Examples of the polyester resin include polyethylene terephthalate, polytrimethylene terephthalate, polybutylene terephthalate, polyethylene naphthalate, and polybutylene naphthalate. These may be used alone, or two or more of these may be used in combination.

Examples of the polyacrylic acid resin include polyacrylates (e.g. polyacrylic acid, methyl polyacrylate, ethyl polyacrylate), poly-α-haloacrylate, poly-α-cyanoacrylate, polyacrylamide, and sodium polyacrylate. These may be used alone, or two or more of these may be used in combination.

The polyurethane is not particularly limited as long as it is a high-molecular compound prepared by copolymerization of a compound containing an isocyanate group and a compound containing a hydroxyl group. Examples of the polyurethane include ester/ether polyurethanes, ether polyurethanes, polyester polyurethanes, carbonate polyurethanes, and acrylic polyurethanes. These may be used alone, or two or more of these may be used in combination.

Examples of the epoxy resin include bisphenol A, bisphenol F, and phenol novolac epoxy resins; polyfunctional tetrakis(hydroxyphenyl)ethane or tris(hydroxyphenyl)methane epoxy resins which have a large number of benzene rings; biphenyl, triphenolmethane, naphthalene, orthonovolac, dicyclopentadiene, amino phenol, and alicyclic epoxy resins; and silicone epoxy resins. These may be used alone, or two or more of these may be used in combination.

Examples of the acrylic resin include, but are not limited to, (meth)acrylic resins and vinyl ester resins. The acrylic resin may be any polymer that contains as a monomer unit a polymerizable monomer containing an acid group (e.g. carboxyl, acid anhydride, sulfonic acid, phosphoric acid group), including, for example, homopolymers or copolymers of the polymerizable monomers containing an acid group, and copolymers of the polymerizable monomers containing an acid group and copolymerizable monomers. These may be used alone, or two or more of these may be used in combination.

The (meth)acrylic resin may be polymerized with a copolymerizable monomer, provided that the resin contains a (meth)acrylic monomer as a main monomer unit (for example, 50 mol % or more), and also provided that at least one of the (meth)acrylic monomer and the copolymerizable monomer contains an acid group. Examples of the (meth)acrylic resin include (meth)acrylic monomers containing the acid group [e.g., (meth)acrylic acid, sulfoalkyl (meth)acrylates, sulfonic acid group-containing (meth)acrylamides] or copolymers thereof; copolymers of (meth)acrylic monomers optionally containing the acid group, with other polymerizable monomers containing the acid group [e.g., other polymerizable carboxylic acids, polymerizable polyhydric carboxylic acids or anhydrides thereof, and vinyl aromatic sulfonic acids] and/or the copolymerizable monomers [e.g. alkyl (meth)acrylates, glycidyl (meth)acrylate, (meth)acrylonitrile, aromatic vinyl monomers]; copolymers of other polymerizable monomers containing the acid group and copolymerizable (meth)acrylic monomers [e.g. alkyl (meth) acrylates, hydroxyalkyl (meth)acrylates, glycidyl (meth) acrylate, (meth)acrylonitrile]; rosin modified urethane acrylates; specially modified acrylic resins; urethane acrylates; epoxy acrylates; and urethane acrylate emulsions.

Preferred among these (meth)acrylic resins are (meth) acrylic acid/(meth)acrylic acid ester polymers (e.g. acrylic acid/methyl methacrylate copolymers), (meth)acrylic acid/(meth)acrylic acid ester/styrene copolymers (e.g. acrylic acid/methyl methacrylate/styrene copolymers) and the like.

The alkoxysilane oligomer refers to a high molecular weight alkoxysilane oligomer formed by condensation of alkoxysilane monomers represented by the formula (III) below, and having at least one siloxane bond (Si—O—Si) per molecule. The structure of the alkoxysilane oligomer is not particularly limited and may be linear or branched. The weight average molecular weight is preferably but not limited to more than 152 but not more than 4000, more preferably 500 to 2500, and still more preferably 500 to 1500. The weight average molecular weight of the oligomer is determined by gel permeation chromatography (GPC).

$$SiR_4 \qquad (III)$$

In the formula, Rs each independently represents hydrogen, hydroxyl, a $C_{1-4}$ alkoxy group, an optionally substituted alkyl group, or an optionally substituted phenyl group, provided that at least one of Rs is a $C_{1-4}$ alkoxy group or hydroxyl.

The alkoxysilane oligomer may be formed from a compound represented by the formula (III) alone or a combination of two or more thereof.

Examples of the polyolefin resin include, but are not limited to, chlorinated polypropylenes, non-chlorinated polypropylenes, chlorinated polyethylenes, and non-chlorinated polyethylenes. These may be used alone, or two or more of these may be used in combination.

The binder (B) containing a reactive functional group and being soluble or dispersible in water or alcohol is preferred for quick drying and excellent adhesion to substrates.

The amount of the binder (B) is preferably but not limited to 0.1 to 1000 parts by weight, and more preferably 5 to 500 parts by weight, per 100 parts by weight of solids of the conductive polymer (A). If the amount is less than 0.1 parts by weight, the resulting transparent conductive laminate may have reduced strength. If the amount is more than 1000 parts by weight, the amount of the conductive polymer (A) in the ink composition becomes relatively small, which may make it impossible to ensure sufficient conductivity in the resulting transparent conductive film.

<(C) Conductivity Enhancer>

A conductivity enhancer (C) is added in order to enhance the electric conductivity of the transparent conductive film formed from the ink composition of the present invention. The conductivity enhancer (C) is evaporated by heating during the formation of the transparent conductive film. This is considered to control alignment of the conductive polymer (A) to enhance the conductivity of the transparent conductive film. Further, the use of the conductivity enhancer (C) allows the amount of the conductive polymer (A) to be reduced while maintaining the surface resistivity, as compared to when no conductivity enhancer (C) is used. Therefore, transparency is advantageously improved.

To ensure conductivity needed for transparent conductive films, the conductivity enhancer (C) is preferably at least one selected from the group consisting of the compounds (i) to (vii):
(i) a compound having a boiling point of 60° C. or higher and containing at least one ketone group in the molecule;
(ii) a compound having a boiling point of 100° C. or higher and containing at least one ether group in the molecule;
(iii) a compound having a boiling point of 100° C. or higher and containing at least one sulfinyl group in the molecule;
(iv) a compound having a boiling point of 100° C. or higher and containing at least one amide group in the molecule;
(v) a compound having a boiling point of 50° C. or higher and containing at least one carboxyl group in the molecule;
(vi) a compound having a boiling point of 100° C. or higher and containing two or more hydroxyl groups in the molecule; and
(vii) a compound having a boiling point of 100° C. or higher and containing at least one lactam group in the molecule.

Examples of the compound (i) having a boiling point of 60° C. or higher and containing at least one ketone group in the molecule include isophorone, propylene carbonate, γ-butyrolactone, β-butyrolactone, and 1,3-dimethyl-2-imidazolidinone. These may be used alone, or two or more of these may be used in combination.

Examples of the compound (ii) having a boiling point of 100° C. or higher and containing at least one ether group in the molecule include diethylene glycol monomethyl ether, diethylene glycol monoethyl ether, diethylene glycol dimethyl ether, 2-phenoxyethanol, dioxane, morpholine, 4-acryloylmorpholine, N-methylmorpholine N-oxide, 4-ethylmorpholine, and 2-methoxyfuran. These may be used alone, or two or more of these may be used in combination.

Examples of the compound (iii) having a boiling point of 100° C. or higher and containing at least one sulfinyl group in the molecule include dimethyl sulfoxide.

Examples of the compound (iv) having a boiling point of 100° C. or higher and containing at least one amide group in the molecule include N,N-dimethylacetamide, N-methylformamide, N,N-dimethylformamide, acetamide, N-ethylacetamide, N-phenyl-N-propylacetamide, and benzamide. These may be used alone, or two or more of these may be used in combination.

Examples of the compound (v) having a boiling point of 50° C. or higher and containing at least one carboxyl group in the molecule include acrylic acid, methacrylic acid, methanoic acid, ethanoic acid, propanoic acid, butanoic acid, pentanoic acid, hexanoic acid, octanoic acid, decanoic acid, dodecanoic acid, benzoic acid, p-toluic acid, p-chlorobenzoic acid, p-nitrobenzoic acid, 1-naphthoic acid, 2-naphthoic acid, phthalic acid, isophthalic acid, oxalic acid, malonic acid, succinic acid, adipic acid, maleic acid, and fumaric acid. These may be used alone, or two or more of these may be used in combination.

Examples of the compound (vi) having a boiling point of 100° C. or higher and containing two or more hydroxyl groups in the molecule include ethylene glycol, diethylene glycol, propylene glycol, trimethylene glycol, β-thiodiglycol, triethylene glycol, tripropylene glycol, 1,4-butanediol, 1,5-pentanediol, 1,3-butanediol, 1,6-hexanediol, neopentyl glycol, catechol, cyclohexanediol, cyclohexanedimethanol, glycerin, erythritol, glycerol, isomalt, lactitol, maltitol, mannitol, sorbitol, xylitol, and sucrose. These may be used alone, or two or more of these may be used in combination.

Examples of the compound (vii) having a boiling point of 100° C. or higher and containing at least one lactam group in the molecule include N-methylpyrrolidone, β-lactam, γ-lactam, δ-lactam, ε-caprolactam, and laurolactam. These may be used alone, or two or more of these may be used in combination.

When the conductivity enhancer (C) has a boiling point of not lower than a specific temperature, the conductivity enhancer (C) will be gradually volatilized by heating during the formation of the transparent conductive film. This volatilization process is considered to result in the alignment of the conductive polymer (A) being favorably controlled in terms of conductivity, so that conductivity is enhanced. On the other hand, if the conductivity enhancer (C) has a boiling point lower than the specific temperature, it is considered that the conductivity enhancer (C) evaporates so rapidly that the alignment of the conductive polymer (A) cannot sufficiently be controlled, resulting in no improvement in conductivity.

Moreover, although not limited thereto, the conductivity enhancer (C) preferably has solubility parameters (SP values) in the following ranges: $\delta_D$=12 to 30, $\delta_H$=3 to 30, $\delta_P$=5 to 30, and $\delta_D+\delta_H+\delta_P$=35 to 70, and more preferably: $\delta_D$=15 to 25, $\delta_H$=10 to 25, $\delta_P$=10 to 25, and $\delta_D+\delta_H+\delta_P$=35 to 70.

The SP values as used herein refer to Hansen solubility parameters in which the solubility of substances is described using three parameters, the dispersion component $\delta_D$, the polar component $\delta_H$, and the hydrogen bonding component $\delta_P$. It is considered that the addition of the conductivity enhancer (C) having SP values within the ranges mentioned above allows the conductive polymer (A) to be pseudo-dissolved to promote alignment of the polymer (A) during the evaporation. On the other hand, the conductivity enhancer (C) having SP values outside the ranges mentioned above is less likely to interact with the conductive polymer (A) and thus may not sufficiently show the effect of enhancing conductivity by controlling the alignment.

Furthermore, the conductivity enhancer (C) having SP values within the ranges mentioned above is highly compatible with the conductive polymer (A), and thus can enhance stability of the dispersion of the conductive polymer (A).

Examples of the conductivity enhancer (C) having SP values in the following ranges: $\delta_D$=12 to 30, $\delta_H$=3 to 30, $\delta_P$=5 to 30, and $\delta_D+\delta_H+\delta_P$=35 to 70 include, but are not limited to, isocyanate ($\delta_D$=15.8, $\delta_H$=10.5, $\delta_P$=13.6), methyl isothiocyanate ($\delta_D$=17.3, $\delta_H$=16.2, $\delta_P$=10.1), trimethyl phosphate ($\delta_D$=15.7, $\delta_H$=10.5, $\delta_P$=10.2), 2-methyllactonitrile ($\delta_D$=16.6, $\delta_H$=12.2, $\delta_P$=15.5), ephedrine ($\delta_D$=18.0, $\delta_H$=10.7, $\delta_P$=24.1), thiourea ($\delta_D$=20.0, $\delta_H$=19.4, $\delta_P$=14.8), carbamonitrile ($\delta_D$=15.5, $\delta_H$=27.6, $\delta_P$=16.8), ethylene cyanohydrin ($\delta_D$=17.2, $\delta_H$=18.8, $\delta_P$=17.6), and pyrazole ($\delta_D$=20.2, $\delta_H$=10.4, $\delta_P$=12.4). These may be used alone, or two or more of these may be used in combination.

Furthermore, the compounds (i) to (vii) having SP values within the ranges mentioned above can be used as the conductivity enhancer (C).

The amount of the conductivity enhancer (C) is preferably but not limited to 5 to 2000 parts by weight, and more preferably 10 to 1500 parts by weight, per 100 parts by weight of solids of the conductive polymer (A). If the amount is less than 5 parts by weight, the conductivity-improving effect may not be sufficiently exerted by adding the conductivity enhancer (C). Conversely, if the amount is more than 2000 parts by weight, the amount of the conductive polymer (A) in the ink composition of the present invention becomes relatively small, which may result in the transparent conductive film having insufficient conductivity.

The ink composition of the present invention may optionally contain other components in addition to the conductive polymer (A), the binder (B), and the conductivity enhancer (C), as long as they do not impair the objectives of the present invention. Examples of other components include thickeners, solvents, crosslinking agents, catalysts, surfactants and/or leveling agents, water-soluble antioxidants, metal nanowires, defoaming agents, and neutralizers.

<Thickener>

A thickener is added in order to adjust the viscosity and rheology properties of the ink composition. The use of a thickener enables the ink composition to have a higher viscosity which cannot be achieved by the viscosity increase due to the conductive polymer (A).

Examples of the thickener include, but are not limited to, known thickeners. The thickener is preferably at least one selected from the group consisting of polyacrylic acid resins, cellulose ether resins, polyvinylpyrrolidones, polyurethanes, carboxyvinyl polymers, and polyvinyl alcohols. Such thickeners are available commercially as, for example, CARBOPOL ETD-2623 (crosslinkable polyacrylic acid, produced by B.F. Goodrich Company), GE-167 (copolymer of N-vinylacetamide and acrylic acid, produced by Showa Denko K.K.), JURYMER (polyacrylic acid, produced by Nihon Junyaku Co., Ltd.), and polyvinylpyrrolidone K-90 (polyvinylpyrrolidone, produced by NIPPON SHOKUBAI CO., LTD.). These may be used alone, or two or more of these may be used in combination.

The reason why these compounds are preferred as the thickener is that these thickeners are quite excellent in compatibility with the conductive polymer (A), and the excellent compatibility provides the following effects:
(1) providing excellent dispersion stability to the conductive polymer (A), resulting in excellent storage stability;
(2) reducing haze and enhancing transparency;
(3) improving adhesion to substrates to be printed;
(4) being able to form fine conductive patterns more precisely;
(5) providing improved wet heat resistance to the ink composition containing the conductive polymer (A) and the thickener; and
(6) being suitable for inks for offset printing, gravure offset printing, or pad printing for the reasons (1) to (5).

The amount of the thickener is preferably but not limited to 0.01 to 250 parts by weight, and more preferably 0.1 to 100 parts by weight, per 100 parts by weight of solids of the conductive polymer (A). This is because the use of the thickener in the range mentioned above can provide an appropriate viscosity. If the amount is less than 0.01 parts by weight, the required viscosity properties may not be satisfied. If the amount is more than 250 parts by weight, precipitates tend to be formed, causing clogging of the printing plate and an increase in haze.

<Surfactant and/or Leveling Agent>

The addition of a surfactant and/or leveling agent can provide improved wettability and leveling properties to the ink composition, and such an ink composition can be used to form a uniform transparent conductive film. In the present invention, one compound may serve as both a surfactant and a leveling agent.

The surfactant is not particularly limited as long as it has the effect of improving leveling properties. Specific examples include siloxane compounds such as polyether-modified polydimethylsiloxanes, polyether-modified siloxanes, polyether ester-modified, hydroxyl group-containing polydimethylsiloxanes, polyether-modified, acrylic group-containing polydimethylsiloxanes, polyester-modified, acrylic group-containing polydimethylsiloxanes, perfluoropolydimethylsiloxanes, perfluoropolyether-modified polydimethylsiloxanes, and perfluoropolyester-modified polydimethylsiloxanes; fluorine compounds such as perfluoroalkyl carboxylic acids and perfluoroalkyl polyoxyethylene ethanols; polyether compounds such as polyoxyethylene alkyl phenyl ethers, propylene oxide polymers, and ethylene oxide polymers; carboxylates such as coconut fatty acid amine salts and gum rosin; ester compounds such as castor oil sulfates, phosphates, alkyl ether sulfates, sorbitan fatty acid esters, sulfonates, and succinates; sulfonate compounds such as alkyl aryl sulfonic acid amine salts and dioctyl sodium sulfosuccinate; phosphate compounds such as sodium lauryl phosphate; amide compounds such as coconut fatty acid ethanolamide; and acrylic compounds. These surfactants may be used alone, or two or more of these may be used in combination. Among these, siloxane compounds and fluorine compounds are preferred, and polyether-modified polydimethylsiloxanes are more preferred. This is because siloxane compounds and fluorine compounds are compatible well with the conductive polymer (A), and thus the composition prepared therefrom has excellent dispersion stability and can easily form a uniform film.

The surfactant may be a commercial product, and specific examples include BYK-301, BYK-302, BYK-307, BYK-331, BYK-333, BYK-337, BYK-341, BYK-375, BYK-378, BYK-380N, BYK-340, and BYK-DYNWET800 (all produced by BYK Japan KK), NIKKOL AM-101, NIKKOL AM-301, and NIKKOL AM-3130N (all produced by Nihon Surfactant Kogyo K.K.), AsahiGuard AG-8025 and AsahiGuard MA-91 (both produced by MEISEI CHEMICAL WORKS, LTD.), AMIPOL AS-8 (produced by NICCA CHEMICAL CO., LTD.), AMOGEN AOL, AMOGEN CB-C, AMOGEN CB-H, AMOGEN LB-C, AMOGEN No. 8, AMOGEN S, and AMOGEN S-H (all produced by DAI-ICHI KOGYO SEIYAKU CO., LTD.), AMPHITOL series (produced by Kao Corporation), ANFOLEX 35N, ANFOLEX 50, and ANFOLEX 50-SF (all produced by MIYOSHI OIL & FAT CO., LTD.), Plas coat RY-2 (produced by GOO Chemical Co., Ltd.), ENAGICOL C-30B (produced by Lion Corporation), OBAZORINE 662N and CATINAL AOC (all produced by TOHO CHEMICAL INDUSTRY Co., Ltd.), OFNON D (produced by YUSHIRO CHEMICAL INDUSTRY CO., LTD.): CLINK A-27 (produced by Yoshimura Oil Chemical Co., Ltd.), Genagen B 1566 (produced by Clariant Japan), and CAPSTONE FS-3100 (produced by Du Pont Kabushiki Kaisha).

Examples of the leveling agent include, but are not limited to, siloxane compounds such as polyether-modified polydimethylsiloxanes, polyether-modified siloxanes, polyether ester-modified, hydroxyl group-containing polydimethylsiloxanes, polyether-modified, acrylic group-containing polydimethylsiloxanes, polyester-modified, acrylic group-containing polydimethylsiloxanes, perfluoropolydimethylsiloxanes, perfluoropolyether-modified polydimethylsiloxanes, and perfluoropolyester-modified polydimethylsiloxanes; fluorine compounds such as perfluoroalkyl carboxylic acids and perfluoroalkyl polyoxyethylene ethanols; polyether compounds such as polyoxyethylene alkyl phenyl ethers, propylene oxide polymers, and ethylene oxide polymers; carboxylates such as coconut fatty acid amine salts and gum rosin; ester compounds such as castor oil sulfates, phosphates, alkyl ether sulfates, sorbitan fatty acid esters, sulfonates, and succinates; sulfonate compounds such as alkyl aryl sulfonic acid amine salts and dioctyl sodium sulfosuccinate; phosphate compounds such as sodium lauryl phosphate; amide compounds such as coconut fatty acid ethanolamide; and acrylic compounds. These leveling agents may be used alone, or two or more of these may be used in combination. Among these leveling agents, siloxane compounds, fluorine compounds, and acrylic compounds are preferred because of their excellent compatibility with common silicone blankets.

The leveling agent may be a commercial product, and specific examples include BYK-325, BYK-345, BYK-346, BYK-347, BYK-348, BYK-349, BYK-UV3500, BYK-380N, BYK-381, BYKETOL-AQ, and BYKETOL-WS (all produced by BYK Japan KK), and POLYFLOW WS, POLYFLOW WS-30, and POLYFLOW WS-314 (all produced by Kyoeisha Chemical CO., Ltd.).

<Water-Soluble Antioxidant>

A water-soluble antioxidant may be added to enhance heat resistance and wet heat resistance of the transparent electrode formed from the ink composition.

Examples of the water-soluble antioxidant include, but are not limited to, reductive water-soluble antioxidants and non-reductive water-soluble antioxidants.

Examples of reductive water-soluble antioxidants include compounds containing a lactone ring substituted with two hydroxyl groups, such as L-ascorbic acid, sodium L-ascorbate, potassium L-ascorbate, D(-)-isoascorbic acid (erythorbic acid), sodium erythorbate, and potassium erythorbate; monosaccharides and disaccharides (excluding sucrose) such as maltose, lactose, cellobiose, xylose, arabinose, glucose, fructose, galactose, and mannose; flavonoids such as catechin, rutin, myricetin, quercetin, kaempferol, and SANMELIN™ Y-AF; compounds having two or more phenolic hydroxy groups, such as curcumin, rosmarinic acid, chlorogenic acid, hydroquinone, 3,4,5-trihydroxybenzoic acid, and tannic acid; and compounds containing a thiol group, such as cysteine, glutathione, and pentaerythritol tetrakis(3-mercaptobutyrate).

Examples of non-reductive water-soluble antioxidants include compounds that absorb ultraviolet light causing oxidative degradation, such as phenyl imidazole sulfonic acid, phenyl triazole sulfonic acid, 2-hydroxypyrimidine, phenyl salicylate, and sodium 2-hydroxy-4-methoxybenzophenone-5-sulfonate.

These water-soluble, antioxidants may be used alone, or two or more of these may be used in combination.

Among these, compounds containing a lactone ring substituted with two hydroxyl groups and compounds having two or more phenolic hydroxyl groups are preferred, and L-ascorbic acid, D(-)-isoascorbic acid, SANMELIN™ Y-AF, and tannic acid are more preferred.

When the ink composition of the present invention contains the water-soluble antioxidant, the amount of the water-soluble antioxidant is preferably but not limited to 0.001 to 500 parts by weight, more preferably 0.01 to 250 parts by weight, and still more preferably 0.05 to 100 parts by weight, per 100 parts by weight of solids of the conductive polymer (A).

If the amount of the water-soluble antioxidant is less than 0.001 parts by weight, the transparent electrode formed from the ink composition may not have sufficiently improved heat resistance and wet heat resistance. Conversely, if the amount thereof is more than 500 parts by weight, the conductive polymer (A) content in the transparent electrode formed from the ink composition becomes small, which may make it impossible to ensure sufficient conductivity in the transparent electrode.

<Metal Nanowire>

A metal nanowire may be added to enhance conductivity of the transparent conductive film formed from the ink composition of the present invention.

Examples of the metal nanowire include elemental metals and metal-containing compounds.

Examples of elemental metals include, but are not limited to, silver, copper, silver, iron, cobalt, nickel, zinc, ruthenium, rhodium, palladium, cadmium, osmium, iridium, and platinum. Examples of metal-containing compounds include, but are not limited to, compounds containing the metals mentioned above. These metal nanowires may be used alone, or two or more of these may be used in combination.

The metal nanowire is preferably at least one selected from the group consisting of silver nanowires, copper nanowires, and gold nanowires. This is because they have a free electron concentration higher than other metal nanowires and are highly conductive.

The diameter of the metal nanowire is preferably but not limited to 1 to 1000 nm, and more preferably 1 to 100 nm. The metal nanowire having a diameter of smaller than 1 nm may easily be broken. The metal nanowire having a diameter of larger than 1000 nm may result in the coating film having higher haze.

The length of the metal nanowire is preferably but not limited to 1 to 1000 μm, and more preferably 1 to 100 μm. If the length is less than 1 μm, a reduction in the conductivity of the coating film may be caused. If the length is more than 1000 μm, the metal nanowire dispersion may have poor stability.

The aspect ratio of the metal nanowire is preferably but not limited to 50 to 10000, and more preferably 70 to 7000.

This is because if the aspect ratio of the metal nanowire is less than 50, a reduction in the conductivity of the coating film can be caused, while if the aspect ratio is more than 10000, the metal nanowire dispersion can have poor stability. The aspect ratio as used herein refers to a ratio of the length to the diameter of the metal nanowire.

<Neutralizer>

The ink composition of the present invention, which contains the conductive polymer (A), is acidic, and this acidic composition may be neutralized with a neutralizer. This is because the neutralization of the liquid ink composition can prevent printing machines and plates from rusting. The neutralizer may be a basic compound, and examples include, but are not limited to, hydroxides and carbonates of alkali metals or alkaline-earth metals, ammonium compounds such as ammonia, and amines.

The ink composition of the present invention may be prepared by mixing the conductive polymer (A), the binder (B), and the conductivity enhancer (C), and optionally other optional components. The prepared ink composition may be filtered through a filter with appropriately sized pores before use. This is because agglomerates formed in the process of preparing the conductive polymer with a high solids content can be removed so that a highly transparent conductive film can be obtained.

The ink composition of the present invention has a viscosity at 25° C. of 5 to 500 dPa·s. A composition having a viscosity of less than 5 dPa·s, which has too much fluidity, cannot remain on a blanket or pad and may thereby have poor transfer rate, and may also result in blurry lines and letters. Conversely, a composition having a viscosity of more than 500 dPa·s may be poor in handling properties. The ink composition preferably has a viscosity at 25° C. of 10 to 400 dPa·s, and more preferably 15 to 300 dPa·s.

The conditions for measuring viscosity are as described above.

The ink composition of the present invention has a solids content of 10% to 80% by weight. If the solids content is less than 10% by weight, the dry film thickness is reduced so that sufficient conductivity cannot be obtained. Additionally, since the solvent content is excessively high, it may be difficult to control rheology so as to be suitable for printing. Conversely, an ink composition having a solids content of more than 80% by weight has lower dispersibility, which may result in increased haze and a damaged film.

The solids content of the ink composition is preferably 15% to 70% by weight, more preferably 20% to 70% by weight, and still more preferably 20% to 60% by weight, for stable printing properties.

The surface tension of the ink composition of the present invention is preferably but not limited to 50 mN/m or less, more preferably 48 mN/m or less, and still more preferably 45 mN/m or less, for good wettability. The lower limit of the surface tension is, for example, but not limited to, 20 mN/m.

The surface tension can be measured with an automatic surface tension meter (CBVP-Z produced by Kyowa Interface Science Co., Ltd.).

The ink composition of the present invention has a surface resistivity of 2000 Ω/sq or low when applied at a wet film thickness of 15 µm. If the surface resistivity is higher than 2000 Ω/sq, conductivity sufficient for transparent electrodes for touch panels or capacitive switches may not be ensured. The surface resistivity is preferably 1500 Ω/sq or low, and more preferably 1200 Ω/sq or low. Since lower surface resistivity is more preferred, the lower limit of the surface resistivity is, for example, but not limited to, 0.1 Ω/sq.

The surface resistivity can be measured using a resistivity meter.

The ink composition of the present invention has a total light transmittance of 70% or higher when applied at a wet film thickness of 15 µm. If the total light transmittance is lower than 70%, the transparency of the resulting transparent electrode may be insufficient. The total light transmittance is preferably 75% or higher, and more preferably 80% or higher.

The haze of the ink composition of the present invention when applied at a wet film thickness of 15 µm is not particularly limited.

The thixotropic index (Ti) at 25° C. of the ink composition of the present invention is preferably but not limited to 0.5 to 20, and more preferably 1 to 15. The ink composition having a Ti of less than 0.5 is likely to cause ink dripping leading to blurry lines and letters, and is thus difficult to use as a printing ink. The composition having a Ti of more than 20 disadvantageously can cause poor leveling, and when used as a printing ink, is likely to print patterns having surface irregularities.

The conditions for measuring thixotropic index are as described above.

The yield stress at 25° C. of the ink composition of the present invention is preferably but not limited to 5 to 1000 Pa, and more preferably 10 to 500 Pa. The ink composition having a yield stress of less than 5 Pa flows even when it is left at rest, and cannot remain on the printing plate, and therefore the composition cannot be printed. Conversely, the composition having a yield stress of more than 1000 Pa does not flow even when a force is applied, and therefore the composition cannot be printed.

The conditions for measuring yield stress are as described above.

The ink composition of the present invention can be suitably used in printing means such as offset printing, gravure offset printing, and pad printing. These printing means, which do not require any complicated process, allow for easy patterning at low costs. Further, the resulting coating film has good appearance and excellent transparency.

The ink composition of the present invention, which has a high solids content, can form a transparent conductive film having a high dry film thickness, even when it is printed by a method that can only provide limited coating thicknesses. For this reason, the composition is preferably used in offset printing, and more preferably gravure offset printing or pad printing.

<<Transparent Electrode>>

Next, the transparent electrode of the present invention will be explained.

The transparent electrode of the present invention is formed from the ink composition of the present invention, and includes a transparent conductive laminate prepared by printing the ink composition of the present invention on a substrate to form a transparent conductive film on the substrate.

The substrate is preferably a transparent substrate. The material of the transparent substrate is not particularly limited as long as it is transparent, and examples include glass, polyester resins such as polyethylene terephthalate (PET), polyethylene naphthalate, and modified polyesters; resins of polyolefins such as polyethylene (PE) resins, polypropylene (PP) resins, polystyrene resins, and cyclic olefin resins; vinyl resins such as polyvinyl chloride and polyvinylidene chloride; polyether ether ketone (PEEK) resins; polysulfone (PSF) resins; polyether sulfone (PES) resins; polycarbonate (PC) resins; polyamide resins; polyimide resins; acrylic resins; and triacetyl cellulose (TAC) resins.

The thickness of the transparent substrate is preferably but not limited to 10 to 10000 µm, and more preferably 25 to 5000 µm. Moreover, the total light transmittance of the transparent substrate is preferably but not limited to 60% or higher, and more preferably 80% or higher.

The transparent electrode of the present invention is prepared by a step of printing the ink composition of the present invention on a substrate. Specifically, the transparent electrode may be prepared by, for example, (I) a step of application by printing and (II) a formation step as mentioned below. Printing allows for patterning to provide a product having a non-conductive portion and a conductive portion provided with conductive patterns.

In the step (I) of application by printing, the ink composition of the present invention may be directly applied to a substrate, or may be applied to a primer layer that is previously formed on a substrate, and is preferably applied on a substrate by a printing method such as offset printing, gravure offset printing, screen printing, or pad printing. Further, if necessary, the step (I) of application by printing may be performed after the surface of the substrate is previously treated. The surface may be treated by, for example, corona treatment, plasma treatment, ITRO treatment, or flame treatment.

In the formation step (II), the ink composition applied on the substrate is heated at 150° C. or lower, whereby a transparent conductive film can be formed on at least one face of the substrate. Although not limited thereto, the heat treatment may be carried out by a conventionally known method, for example, by using a fan oven, an infrared oven, or a vacuum oven. In cases where the ink composition used in the step (I) of application by printing contains a solvent, the solvent is removed by the heat treatment.

The heat treatment is carried out at 150° C. or lower. If the temperature of the heat treatment is higher than 150° C., the types of substrates that can be used are limited, and substrates commonly used in transparent electrode films such as, for example, PET films, polycarbonate films, and acrylic films cannot be used. In the present invention, transparent conductive laminates having sufficient transparency and conductivity can be advantageously obtained by heat treatment even at a temperature of 150° C. or lower. The temperature of the heat treatment is preferably 50 to 140° C., and more preferably 60 to 130° C. The period of the heat treatment is preferably but not limited to 0.1 to 60 minutes, and more preferably 0.5 to 30 minutes.

The transparent electrode of the present invention may be used in any application that requires transparency and conductivity. Examples include, but not limited to, touch panels and touch sensors for various electronic devices such as TVs and mobile phones with liquid crystal, plasma, and field emission displays and the like; transparent electrodes for display elements; and transparent electrodes for solar cells, electromagnetic wave shielding materials, electronic papers, electroluminescent light-controlling elements, and the like; and other applications. Among these applications, uses in capacitive touch panels, capacitive switches, and capacitive touch sensors are preferred. This is because the coating film formed from the ink composition of the present invention has a balance between transparency and conductivity that is suitable for such applications as touch panels and capacitive switches.

EXAMPLES

The present invention will be described below by reference to non-limiting examples. In the following description, the term "part(s)" and "%" represent "part(s) by weight" and "% by weight", respectively, unless otherwise specified.

1. Used Raw Materials

The following raw materials were used in the examples and comparative examples described below.

(A) Conductive Polymer
Aqueous dispersion containing poly(3,4-ethylenedioxythiophene)/polystyrene sulfonic acid (PEDOT/PSS) (Clevios PH1000 produced by Heraeus K.K., solids content 1.1%)
PEDOT/PSS pellet (Orgacon DRY produced by Agfa, solids content 100%)
(B) Binder
Polyurethane binder (HYDRAN APX101H produced by DIC, solids content 45%)
Polyurethane binder (HYDRAN WLS-202 produced by DIC, solids content 35%)
Polyester binder (Gabusen ES-210 produced by Nagase ChemteX Corporation, solids content 25%)
Methyl silicate oligomer (MS-51 produced by Mitsubishi Chemical Corp.)
(C) Conductivity Enhancer
2-Methoxyfuran (reagent produced by NACALAI TESQUE, INC.)
Ethylene cyanohydrin (produced by Tokyo Chemical Industry Co., Ltd., $\delta_D$=17.2, $\delta_H$=18.8, $\delta_P$=17.6)

Thickener
Polyacrylic acid (JUNLON PW-160 produced by TOAGOSEI CO., LTD., solids content 100%)
Surfactant/Leveling Agent
Polyether-modified polydimethylsiloxane (BYK-348 produced by BYK Japan KK, non-volatile content >96%)
Fluorinated surfactant (CAPSTONE FS-3100 produced by Du Pont Kabushiki Kaisha, non-volatile content 100%)
Cocamide propyl betaine (AMOGEN CB-H produced by DAI-ICHI KOGYO SEIYAKU CO., LTD., non-volatile content 29%)
Metal Nanowire
Silver nanowire (T-YP808 produced by SEIKO PMC CORPORATION, aspect ratio 230, solids content 1.0%)
Neutralizer
Ammonia water (10% ammonia water produced by Wako Pure Chemical Industries, Ltd.)
Water-Soluble Antioxidant
Tannic acid (produced by Wako Pure Chemical Industries, Ltd.)
L-Ascorbic acid (produced by Wako Pure Chemical Industries, Ltd.)

2. Preparation of Conductive Polymer (A)

(Preparation Example 1) Preparation of PEDOT/PSS Concentrate 1

An aqueous dispersion containing poly(3,4-ethylenedioxythiophene)/polystyrene sulfonic acid (PEDOT/PSS). (Clevios PH1000 produced by Heraeus K.K., solids content 1.1%) was heated under reduced pressure at 35° C. for 120 minutes to prepare a high solids content PEDOT/PSS having a solids content of 4%.

(Preparation Example 2) Preparation of PEDOT/PSS Concentrate 2

An aqueous dispersion containing poly(3,4-ethylenedioxythiophene)/polystyrene sulfonic acid (PEDOT/PSS) (Clevios PH1000 produced by Heraeus K.K., solids content 1.1%) was heated under reduced pressure at 35° C. for 240 minutes to prepare a high solids content PEDOT/PSS having a solids content of 10%.

(Preparation Example 3) Preparation of PEDOT/PSS Polymerized Product

A 10-L reaction vessel equipped with a stirrer and a nitrogen inlet was charged with 1400 g of ion-exchanged water and 492 g of an aqueous solution of 12.8% by weight polystyrene sulfonic acid (PSS) (Mw=56000), and the solution was stirred for one hour at constant 25° C. while blowing nitrogen through the solution. At this time the solution had a temperature of 25° C., an oxygen concentration of 0.5 mg/L, and a pH of 0.8, and the stirring rate was 300 rpm. The oxygen concentration was determined using a Knick Process Unit $730_2$ with an $O_2$ sensor of InPro 6000 series (produced by Mettler-Toledo International Inc.). Next, 25.4 g (179 mmol) of 3,4-ethylenedioxythiophene (EDOT) (monomer concentration 1.0% by weight), 0.45 g of $Fe_2(SO_4)_3 \cdot 3H_2O$, and 450 g of an aqueous solution of 10.9% by weight $H_2S_2O_8$ were added to the solution to initiate the polymerization reaction. After 12-hour reaction at 25° C., 30 g of $Na_2S_2O_8$ was further added. After additional 12-hour reaction, the solution was treated using ion exchange resins (Lewatit S100H and Lewatit MP62) to give 2200 g of a highly viscous dark blue PEDOT/PSS (solids content 5.0%).

3. Evaluation Method

The measurements and evaluations in the examples and comparative examples were carried out by the following methods.

Solids Content

The weight of the ink compositions obtained in the examples and the comparative examples and the weight of these ink compositions after heating and drying in a fan oven at 120° C. for 2 hours were determined and used to calculate solids content according to the equation below.

Solids content (%)=(Weight of ink composition after drying)/(Weight of ink composition before drying)

Viscosity

Samples were put in a thermostatic bath and kept at 25° C., and viscosity was then measured with a B-type viscometer.

Surface Tension

The surface tension at 25° C. of the ink compositions was measured by the Wilhelmy method using an automatic surface tension meter (CBVP-Z produced by Kyowa Interface Science Co., Ltd.).

Dispersibility

The ink compositions freshly prepared were put in a thermostatic bath and kept at 25° C. After the ink compositions were left at rest for 1 hour, their liquid appearance was visually observed and evaluated based on the following criteria:
Good: No precipitate observed;
Acceptable: Slight precipitate observed;
Poor: Precipitate observed Gravure Offset Printing Properties The ink compositions obtained in the examples and the comparative examples were printed using a pad printing machine (MGO-F1010 produced by MINO GROUP Co., Ltd.). A large number of parallel line patterns (L/S=30 μm/30 μm) were drawn, and pattern reproducibility was visually determined.
(Pattern Reproducibility)
Good: All the parallel line patterns drawn had no defect.
Poor: Some parallel line patterns had a defect.
(Cissing/Unevenness)
Good: The parallel line patterns had no irregularity and no unevenness.
Poor: The parallel line patterns had irregularities and showed unevenness or wrinkles.

Pad Printing Properties

The ink compositions obtained in the examples and the comparative examples were printed using a pad printing machine (TURBO-90 produced by MINO GROUP Co., Ltd.). A metal plate in which a rectangular pattern 15 mm wide by 35 mm long was etched at a depth of 15 μm was used as an original printing plate. Printing was continuously repeated 20 times with the pad printing machine, and the printed articles were visually observed for pattern reproducibility, and cissing/unevenness, and evaluated based on the following criteria:
(Pattern Reproducibility)
Good: All the printed articles had a rectangular pattern drawn without a defect;
Poor: Some printed articles had a rectangular pattern drawn with a defect;
(Cissing/Unevenness)
Good: The rectangular pattern was smooth and uniform as a mirror surface;
Poor: The rectangular pattern had an irregular and non-uniform surface.

Surface Resistivity (SR)

Measurement was carried out using a resistivity meter (Loresta GP MCP-T600 produced by Mitsubishi Chemical Corp.).

Total Light Transmittance (Tt)/Haze

Measurement was carried out using a haze computer HGM-2B produced by Suga Test Instruments Co., Ltd in accordance with JIS K 7150.

Heat Resistance

The coating films were measured for initial surface resistivity and surface resistivity after storage at 80° C. for 240 hours in the same manner as in the measurement of surface resistivity above. The rate of increase in surface resistivity after storage [(surface resistivity after storage)/(initial surface resistivity)] was then calculated and evaluated on the following two-point scale:
Good: The rate of increase in surface resistivity was less than 1.5;
Acceptable: The rate of increase in surface resistivity was at least 1.5 but less than 2.0.

Examples 1 to 14, Comparative Examples 1 and 2

The components at the weight ratios shown in Table 1 below were mixed and filtered using a filter paper (T5500 produced by Seitz) to prepare ink compositions. The obtained ink compositions were evaluated for solids content, viscosity, surface tension, dispersibility, gravure offset printing properties, and pad printing properties by the aforementioned methods. The ink compositions were also applied to a polyethylene terephthalate (PET) film (Lumirror T-60 produced by Toray Industries, Inc.) using a bar coater to give a wet film thickness of 15 μm, and then dried by heating at 120° C. for 10 minutes to form a coating film. The thus coated films were evaluated for surface resistivity, total light transmittance, haze, and heat resistance by the above-described methods. Table 1 shows the results.

TABLE 1

|  |  |  |  | Example ||||||||
|  |  |  |  | 1 | 2 | 3 | 4 | 5 | 6 | 7 | 8 |
| Formulation of ink composition | (A) Conductive polymer | PEDOT/PSS concentrate 1 |  | 29 | 29 | — | — | — | 30 | 29 | 29 |
|  |  | PEDOT/PSS concentrate 2 |  | — | — | 30 | — | — | — | — | — |
|  |  | PEDOT/PSS polymerized product |  | — | — | — | 30 | — | — | — | — |
|  |  | Orgacon DRY |  | — | — | — | — | 4 | — | — | — |
|  |  | Clevious PH1000 |  | — | — | — | — | — | — | — | — |

TABLE 1-continued

|  |  |  | | | | | | | | |
|---|---|---|---|---|---|---|---|---|---|---|
| (B) Binder | | HYDRAN APX101H | 63 | — | — | 80 | — | — | 63 | 63 |
| | | HYDRAN WLS-202 | — | — | 63 | — | — | — | — | — |
| | | Gabusen ES-210 | — | 120 | — | — | 120 | — | — | — |
| | | MS-51 | — | — | — | — | — | 50 | — | — |
| (C) Conductivity enhancer | | 2-Methoxyfuran | 4 | — | 6 | — | 4 | 4 | 4 | 4 |
| | | Ethylene cyanohydrin | — | 4 | — | 4 | — | — | — | — |
| | Thickener | JUNLON PW-160 | — | — | — | — | — | — | 1.5 | — |
| | Surfactant/leveling agent | BYK-348 | 4 | — | 7 | 8 | 4 | 8 | 4 | 4 |
| | | CAPSTONE FS-3100 | — | — | — | — | — | — | — | — |
| | | AMOGEN CB-H | — | — | — | — | — | — | — | — |
| | Solvent | Ethanol | — | 2 | 20 | — | 10 | — | — | — |
| | Metal nanowire | T-YP808 | — | — | 24 | — | — | — | — | — |
| | Neutralizer | 10% Ammonia water | — | — | — | 0.3 | — | 0.3 | — | — |
| | Water-soluble antioxidant | Tannic acid | — | — | — | — | — | — | 1 | — |
| | | L-Ascorbic acid | — | — | — | — | — | — | — | 1 |
| Evaluation of ink composition | Solids content (% by weight) | | 33 | 20 | 21 | 37 | 26 | 48 | 34 | 34 |
| | Viscosity (dPa·s) | | 30 | 15 | 20 | 30 | 15 | 400 | 35 | 35 |
| | Surface tension (mN/m) | | 30 | 35 | 30 | 40 | 35 | 28 | 31 | 31 |
| | Dispersibility | | A | A | A | A | A | A | A | A |
| | Gravure offset printing properties | Pattern reproducibility | A | A | A | A | A | A | A | A |
| | | Cissing/unevenness | A | A | A | A | A | A | A | A |
| | Pad printing properties | Pattern reproducibility | A | A | A | A | A | A | A | A |
| | | Cissing/unevenness | A | A | A | A | A | A | A | A |
| Evaluation of coating film | Surface resistivity (Ω/sq) | | 500 | 700 | 400 | 800 | 500 | 900 | 500 | 500 |
| | Total light transmittance (%) | | 81 | 85 | 84 | 81 | 83 | 86 | 81 | 81 |
| | Haze (%) | | 5 | 4 | 5 | 4 | 6 | 5 | 6 | 5 |
| | Heat resistance | | B | B | B | B | B | B | A | A |

|  |  |  | Example | | | | | | Comparative Example | |
|---|---|---|---|---|---|---|---|---|---|---|
|  |  |  | 9 | 10 | 11 | 12 | 13 | 14 | 1 | 2 |
| Formulation of ink composition | (A) Conductive polymer | PEDOT/PSS concentrate 1 | — | — | — | 30 | 29 | 29 | — | — |
| | | PEDOT/PSS concentrate 2 | 30 | — | — | — | — | — | — | — |
| | | PEDOT/PSS polymerized product | — | 30 | — | — | — | — | — | — |
| | | Orgacon DRY | — | — | 4 | — | — | — | — | — |
| | | Clevious PH1000 | — | — | — | — | — | — | 90 | 90 |
| | (B) Binder | HYDRAN APX101H | — | 80 | — | — | 63 | 63 | — | — |
| | | HYDRAN WLS-202 | 63 | — | — | — | — | — | — | — |
| | | Gabusen ES-210 | — | — | 120 | — | — | — | 10 | 10 |
| | | MS-51 | — | — | — | 50 | — | — | — | — |
| | (C) Conductivity enhancer | 2-Methoxyfuran | 6 | — | 4 | 4 | 4 | 4 | 4 | — |
| | | Ethylene cyanohydrin | — | 4 | — | — | — | — | — | 4 |
| | Thickener | JUNLON PW-160 | — | — | — | 1.5 | — | — | — | 1.5 |
| | Surfactant/leveling agent | BYK-348 | 7 | 8 | 4 | 8 | — | — | 2 | — |
| | | CAPSTONE FS-3100 | — | — | — | — | 4 | — | — | — |
| | | AMOGEN CB-H | — | — | — | — | — | 8 | — | — |
| | Solvent | Ethanol | 20 | — | 10 | — | — | — | — | 20 |
| | Metal nanowire | T-YP808 | 24 | — | — | — | — | — | — | — |
| | Neutralizer | 10% Ammonia water | — | 0.3 | — | 0.3 | — | — | — | — |
| | Water-soluble antioxidant | Tannic acid | 3 | 1.5 | 4 | 1.2 | 1 | 1 | — | — |
| | | L-Ascorbic acid | — | — | — | — | — | — | — | — |
| Evaluation of ink composition | Solids content (% by weight) | | 23 | 38 | 29 | 49 | 34 | 31 | 5 | 3 |
| | Viscosity (dPa·s) | | 24 | 34 | 18 | 415 | 35 | 30 | 2 | 10 |
| | Surface tension (mN/m) | | 30 | 40 | 35 | 29 | 33 | 31 | 55 | 60 |
| | Dispersibility | | A | A | A | A | A | B | A | C |
| | Gravure offset printing properties | Pattern reproducibility | A | A | A | A | A | A | C | C |
| | | Cissing/unevenness | A | A | A | A | A | A | C | C |
| | Pad printing properties | Pattern reproducibility | A | A | A | A | A | A | C | C |
| | | Cissing/unevenness | A | A | A | A | A | A | C | C |
| Evaluation of coating film | Surface resistivity (Ω/sq) | | 400 | 800 | 500 | 900 | 500 | 500 | 3000 | 5000 |
| | Total light transmittance (%) | | 84 | 81 | 83 | 86 | 81 | 81 | 90 | 89 |
| | Haze (%) | | 6 | 5 | 7 | 6 | 6 | 10 | 3 | 5 |
| | Heat resistance | | A | A | A | A | A | A | B | B |

A: Good,
B: Acceptable,
C: Poor (Consideration)

Table 1 shows that the ink compositions of the present invention with high solids content had better gravure offset printing properties and better pad printing properties than conventional ink compositions with low solids content, and were capable of reducing the increase in surface resistivity. Moreover, even though the ink compositions of the present invention had high solids content, they were found to have excellent dispersibility as well. Furthermore, their coating films were excellent in total light transmittance and haze. It is therefore demonstrated that the ink compositions of the present invention can be suitably used as ink compositions for forming transparent electrodes.

The invention claimed is:

1. An ink composition, comprising:
   (A) a conductive polymer;
   (B) a binder; and
   (C) a conductivity enhancer,
   wherein the composition has a viscosity at 25° C. in a range from 5 to 500 dPa·s and a solids content in a range from 10% to 80% by weight,
   the solids content is obtained by a formula:

solids content (wt %)=(weight of the ink composition after drying)/(weight of ink composition before drying), where the ink composition is dried in a fan oven at 120° C. for two hours, and
   the composition exhibits a surface resistivity of 2000 Ω/sq or lower and a total light transmittance of 70% or higher, when applied at wet film thickness of 15 μm.

2. The ink composition according to claim 1, which has a solids content in a range from 20% to 70% by weight.

3. The ink composition according to claim 1, which has a surface tension of 50 mN/m or less.

4. The ink composition according to claim 1, wherein the conductive polymer (A) is a composite of poly(3,4-ethylenedioxythiophene) and polystyrene sulfonic acid.

5. The ink composition according to claim 1, wherein the binder (B) contains a reactive functional group and is soluble or dispersible in water or alcohol.

6. The ink composition according to claim 1, further comprising at least one thickener selected from the group consisting of polyacrylic acid resins, cellulose ether resins, polyvinylpyrrolidones, polyurethanes, carboxyvinyl polymers, and polyvinyl alcohols.

7. The ink composition according to claim 1, further comprising at least one material selected from the group consisting of siloxane compounds, fluorine compounds, and acrylic compounds, wherein the at least one material is a surfactant, a leveling agent, or a combination thereof.

8. The ink composition according to claim 1, further comprising a water-soluble antioxidant that is a compound containing a lactone ring substituted with two hydroxyl groups or is a compound having two or more phenolic hydroxyl groups.

9. The ink composition according to claim 1,
   wherein the conductive polymer (A) is a dispersion prepared by a step of polymerization at a monomer concentration of 0.5% to 2.5% by weight or a dispersion prepared by a concentration step.

10. The ink composition according to claim 1, for use in offset printing.

11. The ink composition according to claim 1, for use in gravure offset printing or pad printing.

12. A transparent electrode, formed from the ink composition according to claim 1.

13. The transparent electrode according to claim 12, which is a capacitive touch sensor.

* * * * *